US011902223B2

(12) United States Patent
Sarceda et al.

(10) Patent No.: US 11,902,223 B2
(45) Date of Patent: Feb. 13, 2024

(54) INTELLIGENT ASSISTANT CONTENT GENERATION

(71) Applicant: Paradox, Inc., Scottsdale, AZ (US)

(72) Inventors: Jessica Anna Sarceda, Scottsdale, AZ (US); Stephen Derek Ost, Scottsdale, AZ (US)

(73) Assignee: Paradox, Inc., Scottsdale, AZ (US)

( * ) Notice: Subject to any disclaimer, the term of this patent is extended or adjusted under 35 U.S.C. 154(b) by 5 days.

(21) Appl. No.: 17/658,301

(22) Filed: Apr. 7, 2022

(65) Prior Publication Data

US 2022/0329545 A1 Oct. 13, 2022

Related U.S. Application Data

(60) Provisional application No. 63/172,371, filed on Apr. 8, 2021.

(51) Int. Cl.
*H04L 51/02* (2022.01)
*G06F 16/33* (2019.01)
(Continued)

(52) U.S. Cl.
CPC .......... *H04L 51/02* (2013.01); *G06F 16/3329* (2019.01); *G06F 16/3334* (2019.01); *G06F 40/35* (2020.01); *H04L 67/306* (2013.01)

(58) Field of Classification Search
CPC ....... H04L 51/02; H04L 67/306; H04L 67/02; G06F 16/3329; G06F 16/3334; G06F 40/35
See application file for complete search history.

(56) References Cited

U.S. PATENT DOCUMENTS 8,296,179 B1 * 10/2012 Rennison ........... G06Q 30/0251
705/14.53
10,594,757 B1 3/2020 Shevchenko et al.
(Continued)

FOREIGN PATENT DOCUMENTS

WO 2011/000046 1/2011
WO 2018/176413 10/2018

OTHER PUBLICATIONS

PCT International Application No. PCT/US22/23826, International Search Report and Written Opinion of the International Searching Authority, dated Aug. 9, 2022, 7 pages.

*Primary Examiner* — Soe Hlaing
(74) *Attorney, Agent, or Firm* — DLA PIPER LLP (US)

(57) ABSTRACT

A computing system receives user activity data from a user interacting with content associated with a third party computing system. The computing system generates a profile for the user based on the user activity data. The profile includes tags indicating attributes about the user. The computing system establishes a communication session between the user and the intelligent assistant via a chat interface. The computing system receives a message from the user to the intelligent assistant. The computing system determines that the message includes at least one key word triggering retrieval of relevant content. Based on the determining, the computing system retrieves content that is associated with the key word and relevant to the user based on the tags associated with the user profile. The computing system causes a client device associated with the user to display the content alongside the chat interface.

20 Claims, 10 Drawing Sheets

(51) Int. Cl.
    *G06F 16/332*     (2019.01)
    *G06F 40/35*     (2020.01)
    *H04L 67/306*     (2022.01)

(56) References Cited

U.S. PATENT DOCUMENTS

| | | | |
|---|---|---|---|
| 2013/0019289 A1* | 1/2013 | Gonser | H04L 63/08 726/6 |
| 2013/0275862 A1* | 10/2013 | Adra | H04L 51/046 715/234 |
| 2016/0313906 A1* | 10/2016 | Kilchenko | G06Q 30/0269 |
| 2019/0356562 A1 | 11/2019 | Watkins et al. | |
| 2021/0065282 A1 | 3/2021 | Colon-Casasnovas et al. | |

* cited by examiner

FIG. 3E

INTELLIGENT ASSISTANT CONTENT GENERATION

CROSS-REFERENCE TO RELATED APPLICATIONS

This application claims priority to U.S. Provisional Application Ser. No. 63/172,371, filed Apr. 8, 2021, which is hereby incorporated by reference in its entirety.

FIELD OF THE DISCLOSURE

Embodiments disclosed herein generally related to a content generation system using an intelligent assistant.

BACKGROUND

Today, content provided by third party systems is mostly static, requiring visitors to search for information. Likewise, when participating in an interactive chat with a human or automated chat, conversations are linear and scripted.

SUMMARY

In some embodiments, a method is disclosed herein. A computing system receives user activity data from a user interacting with content associated with a third party computing system. The user activity is received via one or more integrations injected into code that is associated with an application presenting the content. The application includes a chat interface that links the user to an intelligent assistant hosted by the computing system. The computing system generates a profile for the user based on the user's activity data. The profile includes tags indicating attributes about the user. The computing system establishes a communication session between the user and the intelligent assistant via the chat interface. The computing system receives a message from the user to the intelligent assistant. The computing system determines that the message includes at least one key word triggering retrieval of relevant content. Based on the determining, the computing system retrieves content that is associated with the key word and relevant to the user based on the tags associated with the user's profile. The computing system causes a client device associated with the user to display the content alongside the chat interface.

In some embodiments, a non-transitory computer readable medium is disclosed herein. The non-transitory computer readable medium includes instructions which, when executed by a computing system, cause a computing system to perform operations. The operations include receiving, from the computing system, activity data from a user interacting with content that is associated with a third party computing system. The user activity is received via one or more integrations injected into code that is associated with an application presenting the content. The application includes a chat interface linking the user to an intelligent assistant hosted by the computing system. The operations further include generating, by the computing system, a profile for the user based on the user's activity data. The profile includes tags indicating attributes about the user. The operations further include establishing, by the computing system, a communication session between the user and the intelligent assistant via the chat interface. The operations further include receiving, from the computing system, a message from the user to the intelligent assistant. The operations further include determining, by the computing system, that the message comprises at least one key word triggering retrieval of relevant content. The operations further include, based on the determining, retrieving, by the computing system, content that is associated with the key word and relevant to the user based on the tags associated with the user's profile. The operations further include causing, by the computing system, a client device associated with the user to display the content alongside the chat interface.

In some embodiments, a system is disclosed herein. The system includes a processor and a memory. The memory includes programming instructions stored thereon, which, when executed by the processor, cause the system to perform operations. The operations include receiving activity data from a user interacting with content that is associated with a third party computing system. The user activity is received via one or more integrations injected into code that is associated with an application presenting the content. The application includes a chat interface linking the user to an intelligent assistant hosted by the computing system. The operations further include generating a profile for the user based on the user's activity data. The profile includes tags indicating attributes about the user. The operations further include establishing a communication session between the user and the intelligent assistant via the chat interface. The operations further include receiving a message from the user to the intelligent assistant. The operations further include determining that the message includes at least one key word triggering retrieval of relevant content. The operations further include, based on the determining, retrieving content that is associated with the key word and relevant to the user based on the tags associated with the user's profile. The operations further include causing a client device associated with the user to display the content alongside the chat interface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3E illustrates an example view of a graphical user interface presenting content hosted by a third party system, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein improve upon conventional intelligent assistant experience systems by providing contextual information relevant to the user as it is discovered through a communication session with the intelligent assistant. For example, during the course of a communication session, the present system may provide the user with content relevant to topics discussed with the intelligent assistant. In this manner, the content displayed may be personalized for the user based on the data about such user.

The term "user" as used herein includes, for example, a person or entity that owns a computing device or wireless device; a person or entity that operates or utilizes a computing device or wireless device; or a person or entity that is otherwise associated with a computing device or wireless device. It is contemplated that the term "user" is not intended to be limiting and may include various examples beyond those described.

Figure 1:
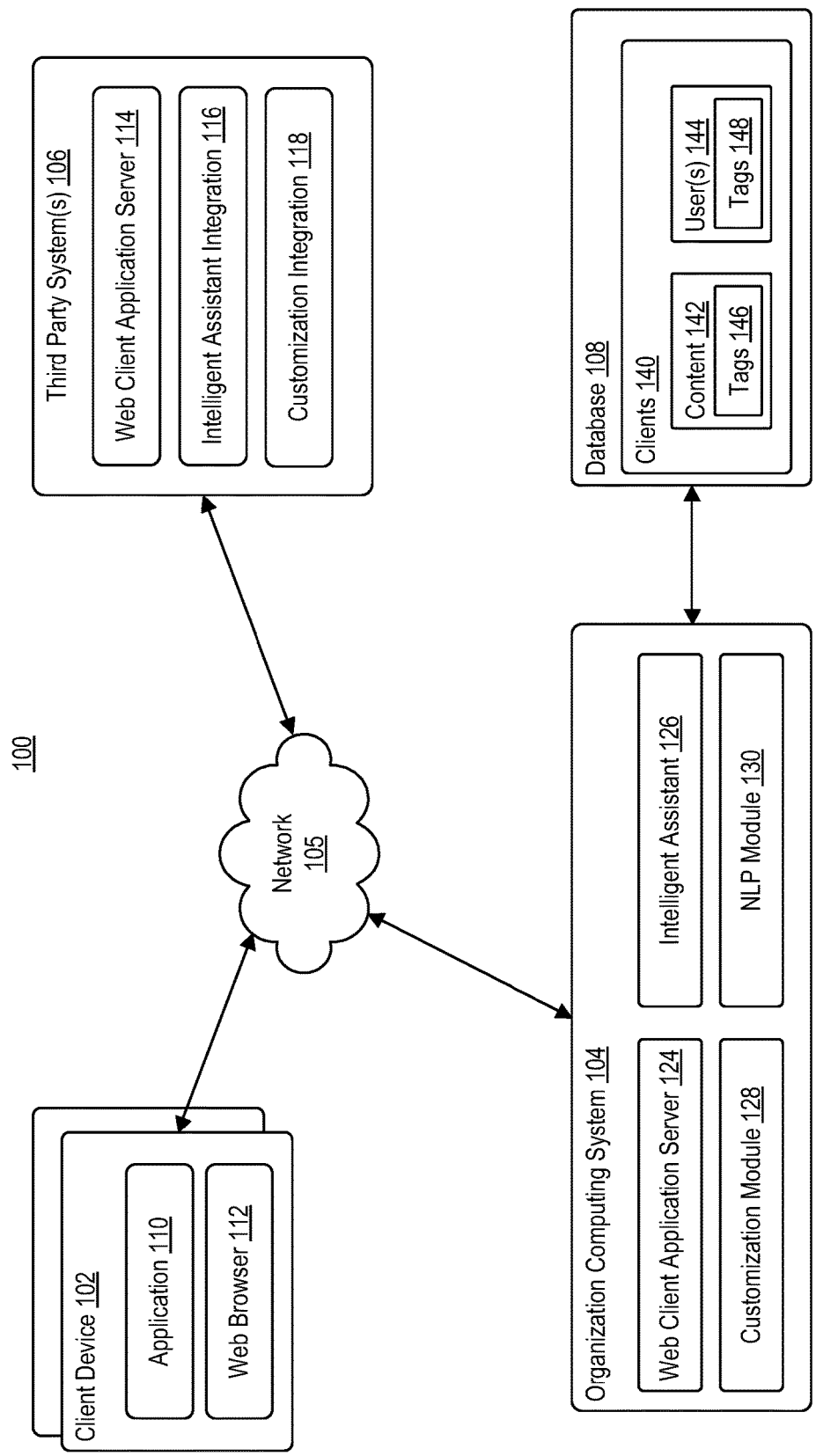
FIG. 1 is a block diagram illustrating a computing environment, according to one exemplary embodiment.

FIG. 1 is a block diagram illustrating computing environment 100, according to one embodiment. Computing environment 100 may include at least one or more client devices 102, an organization computing system 104, and a third party system 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

Client device 102 may be operated by a user. For example, client device 102 may be a mobile device, a tablet, a desktop computer, or any computing system having the capabilities described herein. Client device 102 may belong to or be provided to a customer or may be borrowed, rented, or shared. Customers may include individuals such as, for example, subscribers, clients, prospective clients, or prospective job candidates of an entity associated with third party system 106, such as individuals who may be interested in employment with an entity associated with third party systems 106.

Client device 102 may include at least application 110 and web browser 112. In some embodiments, application 110 may be a standalone application associated with third party system 106. In some embodiments, web browser 112 may allow access to a website associated with third party system 106. Client device 102 may access application 110 or web browser 112 to access content associated with third party system 106. In some embodiments, client device 102 may communicate over network 105 to request a webpage, for example, from web client application server 114 of third party system 106. For example, client device 102 may be configured to execute application 110 or web browser 112 to access content managed by web client application server 114. The content that is displayed to client device 102 may be transmitted from web client application server 114 to client device 102, and subsequently processed by application 110 or web browser 112 for display through a graphical user interface (GUI) of client device 102.

Third party system 106 may include at least web client application server 114, intelligent assistant integration 116, and customization integration 118. Intelligent assistant integration 116 may allow third party system 106 to incorporate an intelligent assistant associated with organization computing system 104 into a website associated with third party system 106 or content presented via application 110 associated with third party system 106. For example, an intelligent assistant may be incorporated into webpages of websites associated with third party system 106, web-based platforms, messaging applications (e.g., Facebook Messenger, WhatsApp®, Signal, and the like), a mobile application (e.g., standalone application 110), a short message service (SMS) application, a multimedia messaging service (MMS) application, and the like. For example, intelligent assistant integration 116 may take the form of code that may be injected into the web code of a website hosted by web client application server 114. In another example, intelligent assistant integration 116 may take the form of code that may be injected into the code of application 110 executing on client device 102. Once injected into the web code of the website or code of application 110, an intelligent assistant supported by organization computing system 104 may be incorporated into content provided by third party system 106. As such, when a user of client device 102 accesses application 110, application 110 may render an intelligent assistant associated with organization computing system 104. In some embodiments, when a user of client device 102 requests a website from web client application server 114, web browser 112 may render an intelligent assistant associated with organization computing system 104 within the website.

Customization integration 118 may allow third party system 106 to provide customized content to a user interacting with a website or application 110 associated with third party system 106. For example, customization integration 118 may take the form of code that is injected to the web code of a website or code of application 110 associated with third party system 106. In some embodiments, once injected into the web code of the website, when the user of client device 102 requests the web page from web client application server 114, customization integration 118 may allow organization computing system 104 to track user activity on the website. In some embodiments, once injected into the code of application 110, when user of client device 102 accesses application 110, customization integration 118 may allow organization computing system 104 to track user activity while interacting with application 110. For example, customization integration 118 may allow organization computing system 104 to track document upload (e.g., resume upload), internet protocol (IP) information (e.g., device location), campaigns (e.g., sites the user visited from), pages of the website viewed, portions of the website viewed (e.g., job postings), time spent on webpages of a website, browser language, and the like. In this manner, customization integration 118 may enable organization computing system 104 to provide users with curated content tailored to the users' needs.

Organization computing system 104 may include at least web client application server 124, intelligent assistant 126, customization module 128, and natural language processing (NLP) module 130. Each of intelligent assistant 126, customization module 128, and NLP module 130 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather than as a result of instructions.

In some embodiments, when client device 102 requests a website from web client application server 114 from third party system 106, web client application server 114 may provide web browser 112 of client device 102 with web code associated with the web page. For example, web browser 112 may transmit a hypertext transfer protocol (HTTP) request to web client application server 114. Web client application server 114 may read the request and transmit an HTTP message back to application 110. The response from web client application server 114 may include hypertext text markup language (HTML) code corresponding to the website. The HTML, code may include the web code associated with intelligent assistant integration 116 and customization integration 118. Accordingly, when web browser 112 processes the HTML code for presentation of the website to the user, a connection may be established between client device 102 and organization computing system 104.

In some embodiments, when client device 102 accesses content associated with third party system 106 via application 110, application 110 may utilize one or more application programming interfaces (APIs) to access functionality of intelligent assistant integration 116 and customization integration 118. Accordingly, when application 110 establishes a connection with back end computing system 104 via one or more APIs, a connection may be established between client device 102 and back end computing system 104.

Intelligent assistant 126 may be configured to interact with a user while the user browses the webpage provided by third party system 106. For example, as a user interacts with an interface associated with intelligent assistant 126, intelligent assistant 126 may receive messages from client device 102. Intelligent assistant 126 may utilize one or more natural language processing and machine learning techniques to determining a meaning of the user's message and generate an appropriate message for response. In some embodiments, intelligent assistant 126 may be configured to process the messages provided by the user to identify one or more keywords contained in the message. The one or more keywords identified by intelligent assistant 126 may be utilized by customization module 128 to provide customized content to the user.

Customization module 128 may be configured to retrieve customized content for the user. In some embodiments, customization module 128 may retrieve customized content for the user based on one or more of keywords and/or phrases provided by the user to intelligent assistant 126, as well as activity streams provided by customization integration 118 to customization module 128. For example, the activity stream may include, but is not limited to, document upload (e.g., resume upload), internet protocol (IP) information (e.g., device location), campaigns (e.g., websites the user visited from), pages of the website viewed, portions of the website viewed (e.g., job postings), time spent on each webpage of the website, browser language, cursor movements, portions of the application viewed, time spent on each portion of the application, and the like.

Customization module 128 may be configured to build a profile for the user. In some embodiments, customization module 128 may build a profile for the user in real-time (or near real-time) based on the one or more keywords and/or phrases and the activity using one or more heuristics to identify content to be provided to the user. The profile may include attributes about the user, such as, but not limited to, location information, employment history, age, gender, educational background, areas of interest, and the like. In some embodiments, the profile may further include one or more tags corresponding to attributes of the user. The one or more tags may allow customization module 128 to retrieve relevant content from database 108 for presentation to the user.

In some embodiments, the content provided to user of client device 102, either via application 110 or web browser 112, may include an option for users to upload documents. Exemplary documents may include, but are not limited to, resumes, cover letters, school transcripts, recommendation letters, completed questionnaires, and the like. NLP module 130 may be configured to analyze and process documents uploaded by an end user via the website. In some embodiments, the user may upload a document when prompted by intelligent assistant 126. NLP module 130 may be configured to extract information that may be used by customization module 128 for generating the profile of the user. For example, NLP module 130 may extract information directed to: employment history, education history, job skills, keywords, and the like. NLP module 130 may provide the extracted information to customization module 128 for continued generation of the user's profile.

In some embodiments, customization module 128 may be in communication with database 108. Database 108 may be configured to store content associated with various clients 140. Each client 140 may correspond to an entity associated with a respective third party system 106. In this manner, each third party system 106 may store content to be delivered to end users in database 108 associated with organization computing system 104, such that customization module 128 may retrieve relevant information to provide to an end user.

As shown, each client 140 may include content 142 and users 144. Content 142 may correspond to content unique to a client associated with a respective third party system 106. In some embodiments, content 142 may include information unique to the client. Using a specific example, content 142 may include information unique to the onboarding or hiring process of the client, such as, but not limited to, human resource information. Content 142 may include one or more tags 146. Tags 146 may correspond to attributes or categories to be associated with a respective piece of content 142. In this manner, customization module 128 may match one or more tags associated with the user's profile to tags 146 of content 142. Tags 146 may allow customization module 128 to retrieve relevant content from database 108 for presentation to the user.

Users 144 may correspond to one or more users that have accessed content associated with third party system 106. In some embodiments, users 144 may be representative of one or more user profiles generated by customization module 128. Each user 144 may include one or more tags 148 associated therewith. As provided above, tags 148 may allow customization module 128 to retrieve relevant content 142 from database 108 for presentation to the user. For example, when providing relevant content to a user, customization module 128 may match tags 148 associated with the user with tags 146 associated with content 142. In this manner, customization module 128 may provide the user with relevant content, given the context of the user's interaction with intelligent assistant 126.

Figure 2:
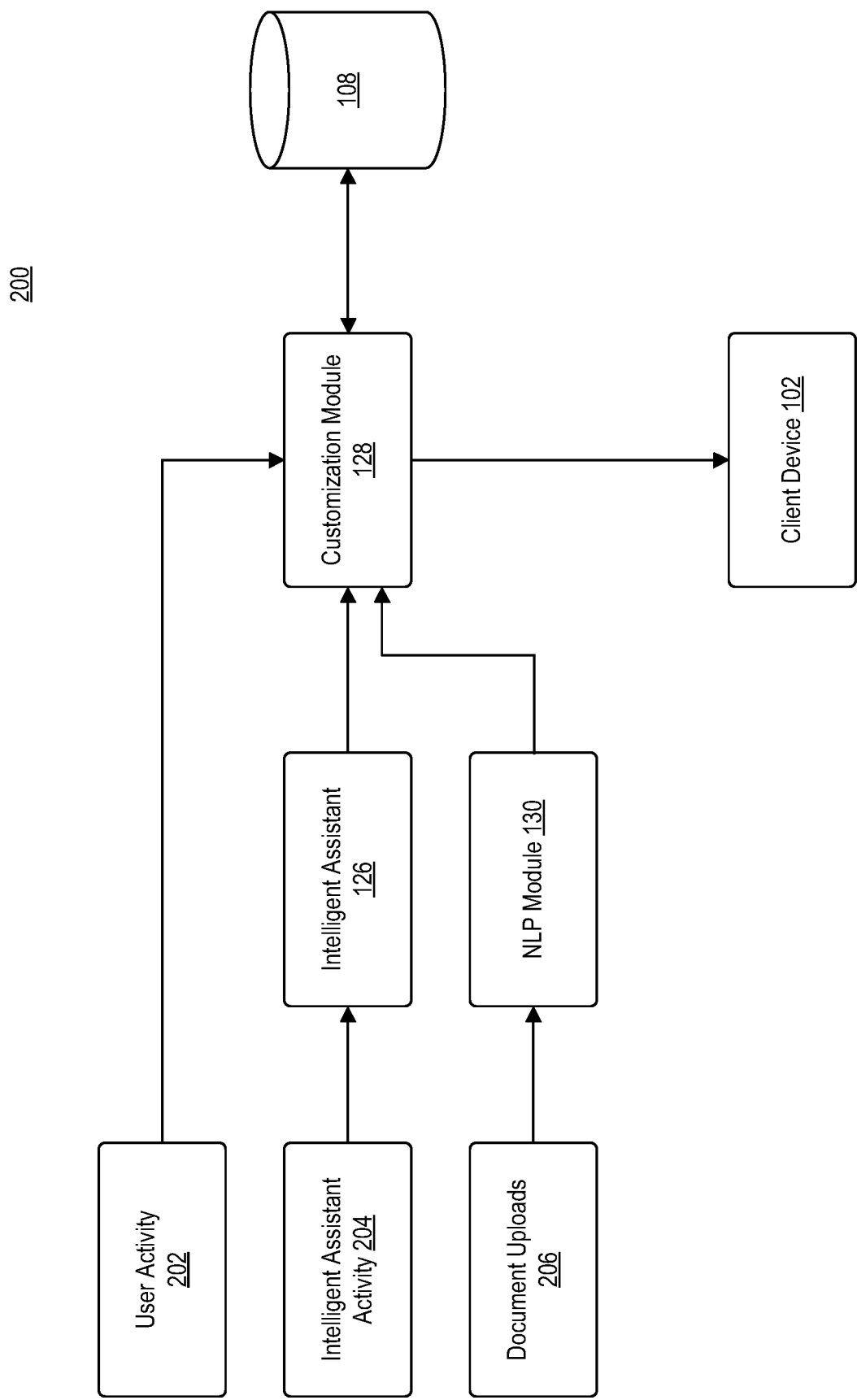
FIG. 2 is a block diagram illustrating the flow of information in computing environment 100, according to example embodiments.

FIG. 2 is a block diagram illustrating flow 200 of information in computing environment 100, according to example embodiments. As shown, organization computing system 104 may receive, as inputs, user activity 202, intelligent assistant activity 204, and document uploads 206. User activity 202 may correspond to one or more of IP information (e.g., device location), campaigns (e.g., websites the user visited from), pages of the website viewed, portions of the website viewed (e.g., job postings), time spent on each webpage of the website, browser language, cursor movements, portions of content viewed via application 110, time spent on each portion of content in application 110, and the like. User activity 202 may be received at organization computing system 104 using customization integration 118.

Intelligent assistant activity 204 may correspond to communications between an end user of client device 102 and intelligent assistant 126. As a user interacts with an interface associated with intelligent assistant 126, intelligent assistant 126 may receive messages from client device 102. Intelligent assistant 126 may utilize one or more natural language processing and machine learning techniques to determine a meaning of the user's message and generate an appropriate message for response. In some embodiments, intelligent assistant 126 may be configured to process the messages provided by the user to identify one or more keywords contained in the message. The one or more keywords identified by intelligent assistant 126 may be utilized by customization module 128 for providing customized content to the user.

Document uploads 206 may correspond to one or more documents uploaded by a user during the user's communication session with intelligent assistant 126. Documents may include, but are not limited to, resumes, cover letters, school transcripts, recommendation letters, completed questionnaires, and the like. NLP module 130 may receive and analyze document uploads 206. NLP module 130 may extract information that may be used by customization module 128 for generating the profile of the user. For example, NLP module 130 may extract information directed to: employment history, education history, job skills, keywords, and the like. NLP module 130 may provide the extracted information to customization module 128 for continued generation of the user's profile.

Importantly, customization module 128 does not need to wait until it receives all information from intelligent assistant 126, NLP module 130, or customization integration 118. Instead, customization module 128 may be configured to continuously and dynamically generate and update a profile of the user based on incoming streams of user activity data. Accordingly, customization module 128 may continuously update the user's profile and retrieve relevant information from database 108 for presentation to the user based on the continuously updated profile.

In some embodiments, customization module 128 may retrieve content from database 108 based on the current context of a dialogue established between intelligent assistant 126 and client device 102. For example, customization module 128 may retrieve certain content from database 108, based on one or more key words or phrases identified by intelligent assistant 126. In this manner, customization module 128 may serve the user with content relevant to the user's conversation with intelligent assistant 126, in real-time, as the conversation progresses.

Figure 3A:
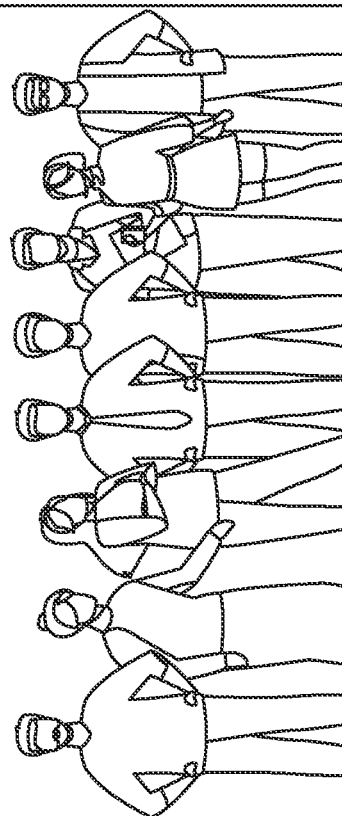
FIG. 3A illustrates an example view of a graphical user interface presenting content hosted by a third party system, according to example embodiments.

FIG. 3A illustrates an example view of a graphical user interface 300 (hereinafter "GUI 300") presenting content hosted by third party system 106, according to example embodiments. In some embodiments, GUI 300 may be a webpage presented in web browser 112 of client device 102. In some embodiments, GUI 300 may be a graphical user interface generated by application 110 executing on client device 102.

As illustrated, GUI 300 may present content 302 (e.g., a webpage or portions of an application) to the user. As shown, content 302 may correspond to a hiring page associated with third party system 106. GUI 300 may further include an intelligent assistant prompt 304. Intelligent assistant prompt 304 may be representative of a graphical element, which, when interacted with, may establish an interactive communication session with intelligent assistant 126.

Figure 3B:
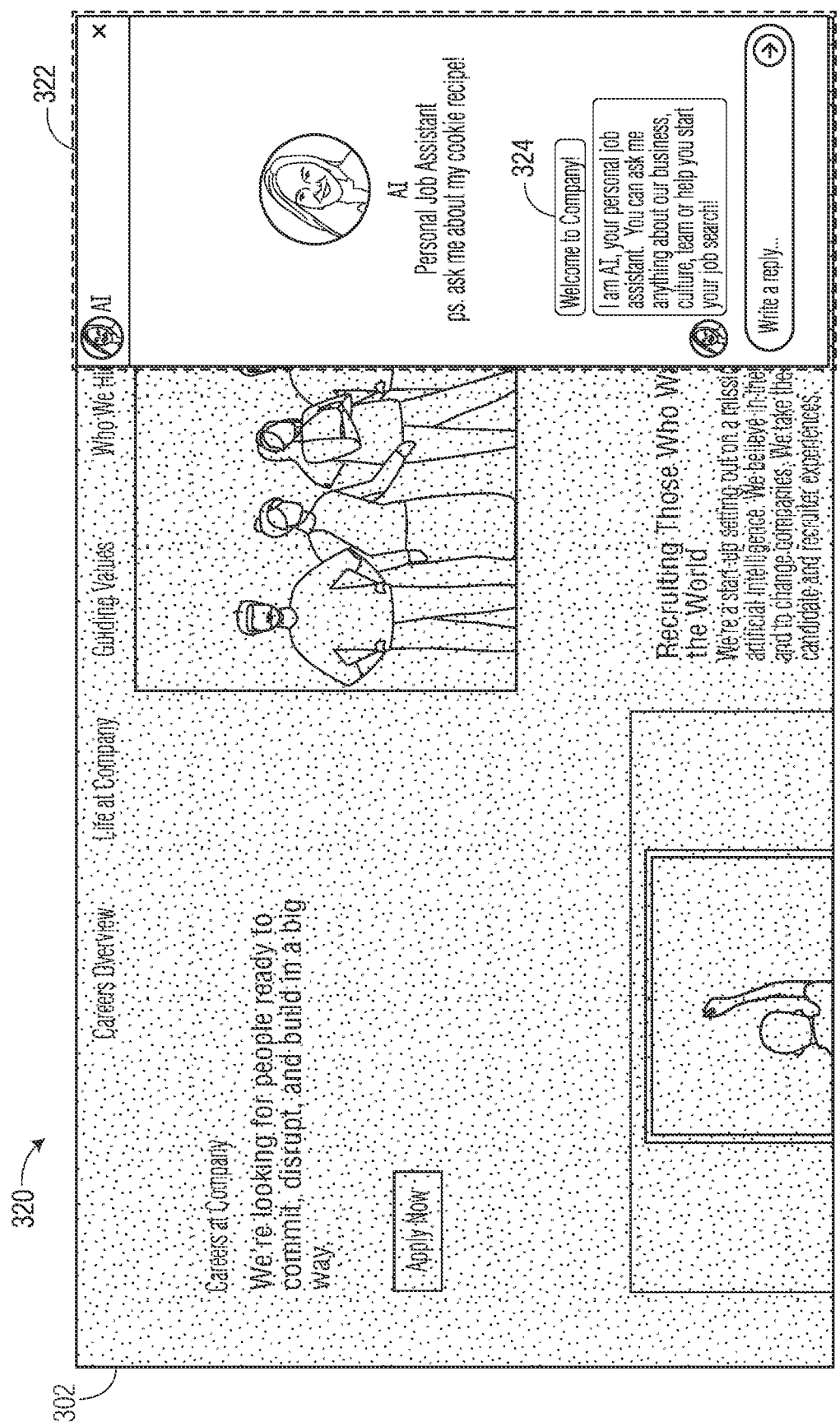
FIG. 3B illustrates an example view of a graphical user interface presenting content hosted by a third party system, according to example embodiments.

FIG. 3B illustrates an example view of a graphical user interface 320 presenting content hosted by third party system 106, according to example embodiments. Graphical user interface 320 (hereinafter "GUI 320") may correspond to an updated view responsive to the user interacting with intelligent assistant prompt 304 in GUI 300. In some embodiments, GUI 320 may be a webpage presented in web browser 112 of client device 102. In some embodiments, GUI 320 may be a graphical user interface generated by application 110 executing on client device 102.

As illustrated, GUI 320 may include an intelligent assistant area 322. Intelligent assistant area 322 may be representative of a chat interface or chat integration that links the user to functionality of intelligent assistant 126. Intelligent assistant 126 may initiate the conversation with the user by sending one or more messages 324 to the user. One or more messages 324 may be used to gather additional details from the user during the conversation.

Figure 3C:
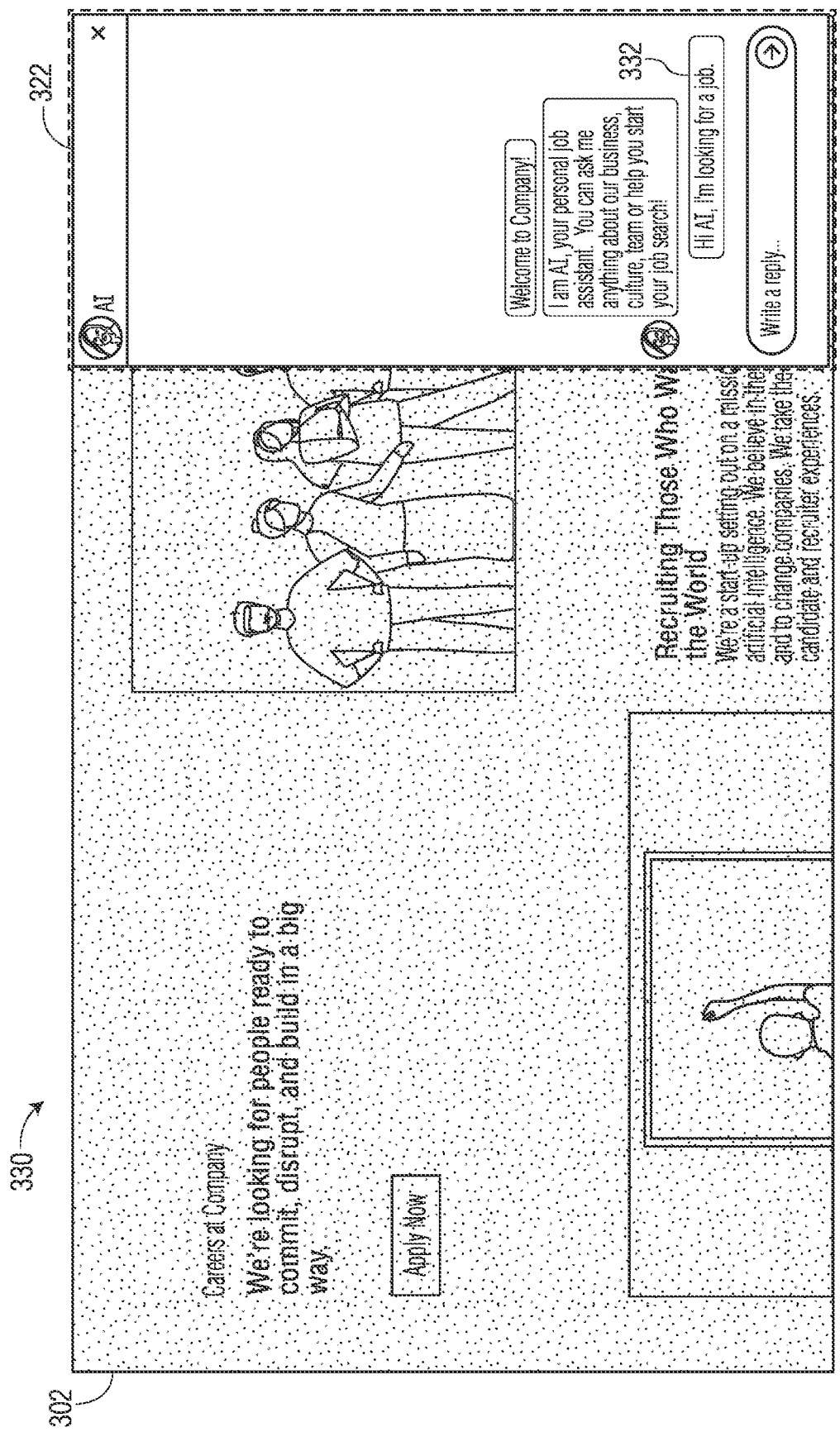
FIG. 3C illustrates an example view of a graphical user interface presenting content hosted by a third party system, according to example embodiments.

FIG. 3C illustrates an example view of a graphical user interface 330 presenting content hosted by third party system 106, according to example embodiments. Graphical user interface 330 (hereinafter "GUI 330") may correspond to an updated view responsive to the intelligent assistant 126 providing one or more messages 324 to client device 102. In some embodiments, GUI 330 may be a webpage presented in web browser 112 of client device 102. In some embodiments, GUI 330 may be a graphical user interface generated by software application 110 executing on client device 102.

As shown, a user may respond to one or more messages 324 with one or more messages 332. One or more messages 332 may be provided to intelligent assistant 126 using the chat interface of intelligent assistant area 322. One or more messages 332 may be provided to intelligent assistant 126 for further analysis.

Figure 3D:
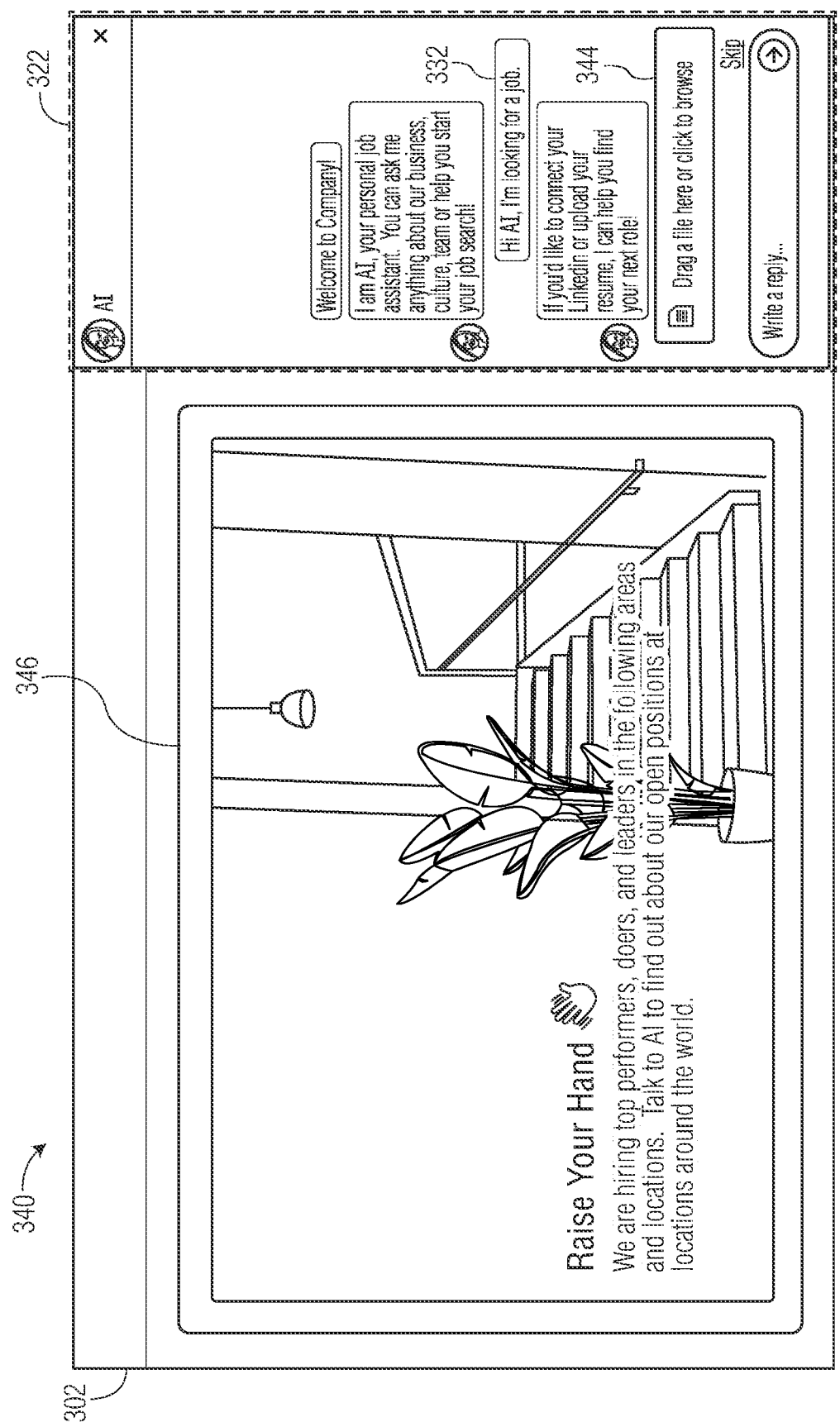
FIG. 3D illustrates an example view of a graphical user interface presenting content hosted by a third party system, according to example embodiments.

FIG. 3D illustrates an example view of a graphical user interface 340 presenting content hosted by third party system 106, according to example embodiments. Graphical user interface 340 (hereinafter "GUI 340") may correspond to an updated view responsive to customization module 128 providing customized content to client device 102. In some embodiments, GUI 340 may be a webpage presented in web browser 112 of client device 102. In some embodiments, GUI 340 may be a graphical user interface generated by application 110 executing on client device 102.

As shown, responsive to intelligent assistant 126 receiving message 332 from client device 102, intelligent assistant 126 may process message 332 to identify one or more key words or trigger words contained therein. Message 332 recites: "Hi Olivia, I'm looking for a job." The word "job" may be associated with a key word or trigger word that may prompt intelligent assistant 126 to instruct customization module 128 to provide customized content to client device 102. Based on identifying the key word or trigger word, customization module 128 may identify relevant content for the user from database 108. Customization module 128 may provide the relevant content to client device 102 for display via web browser 112 or application 110. For example, as shown, relevant content 346 may be displayed adjacent to intelligent assistant area 322. In this manner, a user may be provided with content relevant to their conversation with intelligent assistant 126.

In some embodiments, intelligent assistant 126 may further prompt a user of client device 102 for further information. For example, as shown, intelligent assistant 126 may prompt a user to upload relevant documents. To do so, a document upload prompt 344 may appear within the webpage. As illustrated, document upload prompt 344 may appear within intelligent assistant area 322. In this manner, a user may drag and drop relevant documents within intelligent assistant area 322. Organization computing system 104 may review and analyze the relevant documents to determine whether any additional content may be provided to the user.

Figure 3E:
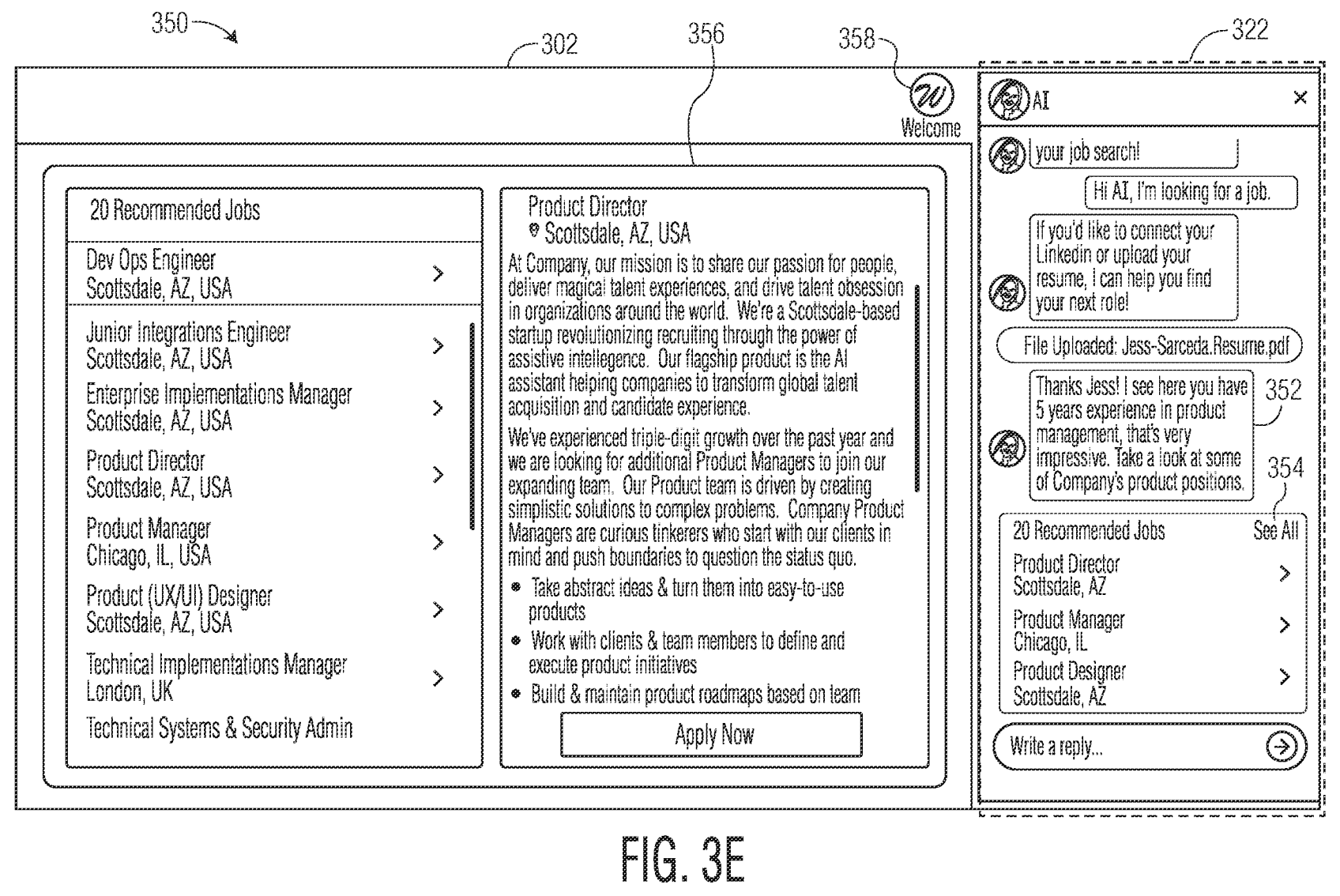

FIG. 3E illustrates an example view of a graphical user interface 350 presenting content hosted by third party system 106, according to example embodiments. Graphical user interface 350 (hereinafter "GUI 350") may correspond to an updated view responsive to a user uploading a document. In some embodiments, GUI 350 may be a webpage presented in web browser 112 of client device 102. In some embodiments, GUI 350 may be a graphical user interface generated by application 110 executing on client device 102.

Responsive to receiving a document via document upload prompt 344, NLP module 130 may review and analyze the contents of the document. NLP module 130 may provide information about the document to customization module 128 for retrieval of relevant information. For example, based on analyzing the document, NLP module 130 may determine that the user has experience with product management. As such, NLP module 130 may prompt customization module 128 to retrieve content related to product management jobs.

As shown, customization module 128 may retrieve content relevant to product management positions to present within the webpage. In some embodiments, customization module 128 may cause client device 102 to display the product management position information within intelligent assistant area 322 (as shown by reference 354). In some embodiments, customization module 128 may cause client device 102 to display the product management position information adjacent to intelligent assistant area 322 (as shown by "356" in FIG. 3E).

In some embodiments, NLP module 130 may further prompt intelligent assistant 126 with respect to the contents of the document. For example, as shown, responsive to NLP module 130 determining that the user has experience with product management, intelligent assistant 126 may send the user message 352, further engaging the user based on the newly discovered information.

In some embodiments, new content may be provided, and indicator 358 may be added the displayed content. Indicator 358 may correspond to content previously presented within the web browser 112 or application 110. For example, indicator 358 may correspond to the Welcome content that is shown in GUI 340. As such, when a user interacts with indicator 358, GUI 350 may be updated to present content 346, i.e., content corresponding to indicator 358.

Figure 3F:
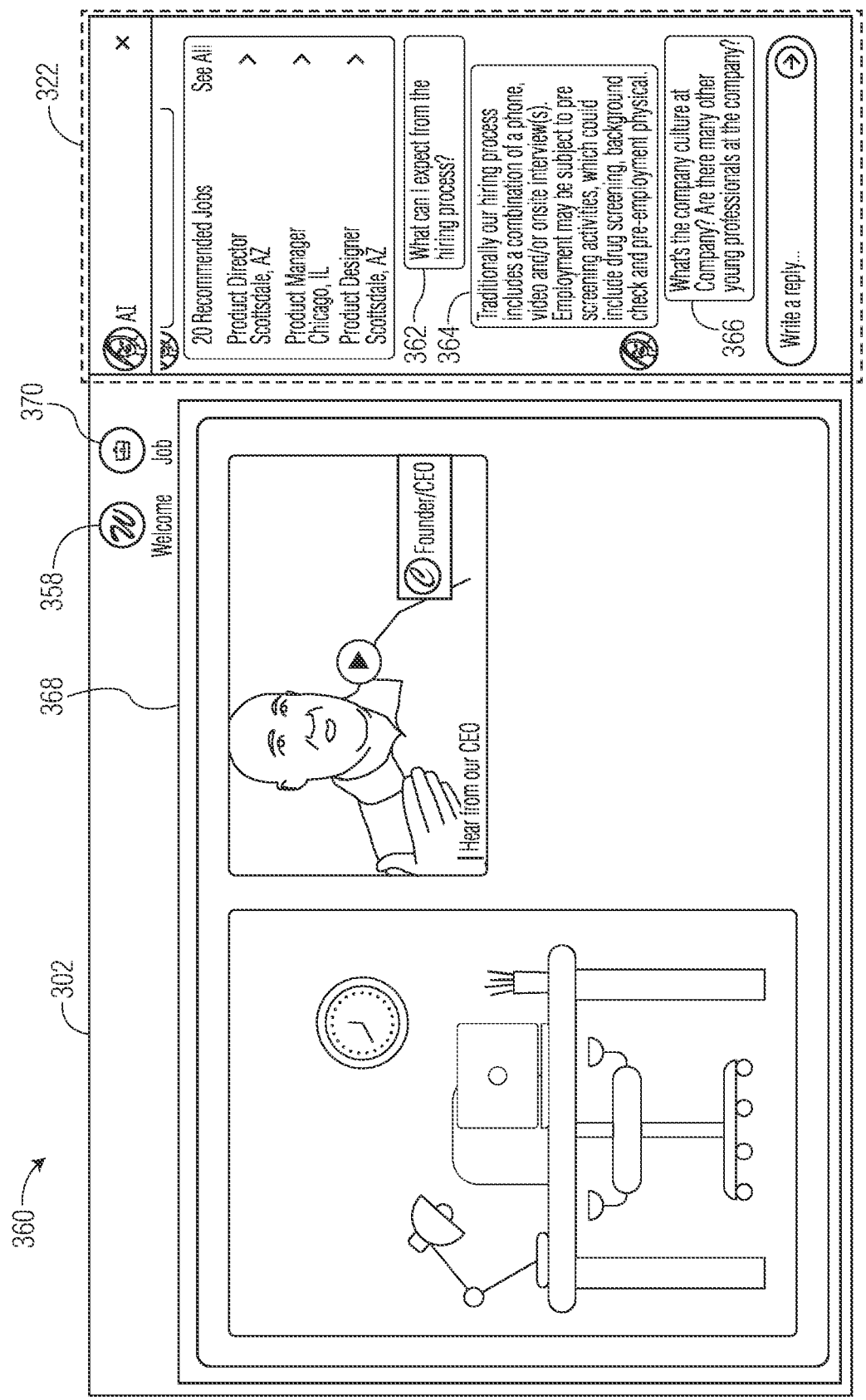
FIG. 3F illustrates an example view of a graphical user interface presenting content hosted by a third party system, according to example embodiments.

FIG. 3F illustrates an example view of a graphical user interface 360 presenting content hosted by third party system 106, according to example embodiments. Graphical user interface 360 (hereinafter "GUI 360") may correspond to an updated view responsive to a user submitting a question to intelligent assistant 126. In some embodiments, GUI 360 may be a webpage presented in web browser 112 of client device 102. In some embodiments, GUI 360 may be a graphical user interface generated by application 110 executing on client device 102.

As shown, a user may generate a message 362 for intelligent assistant 126. Message 362 may seek further information about the hiring process. Responsive to receiving message 362, intelligent assistant 126 may respond with message 364 to be presented to the user. Additionally, customization module 128 may be prompted to serve additional content 368 to the user. Content 368 may be relevant to the question asked by the user. In some embodiments, customization module 128 may be prompted to retrieve additional content, responsive to intelligent assistant 126 identifying a key word or trigger word in message 362. In the example shown in FIG. 3F, the user is seeking additional information about the hiring process.

As shown, content 368 may be reflective of information about the hiring process. Content 368 may take the form of one or more images, documents, videos, or audio files that may be presented to the user within the webpage.

At any point, the user may respond with follow up messages, such as that illustrated as message 366.

Importantly, as the user is interacting with intelligent assistant 126 and content presented to the user, customization module 128 may be continually building or updating a profile associated with the user. As customization module 128 learns additional information about the user, customization module 128 may be able to provide the user with more targeted content.

In some embodiments, as new content is provided, additional indicators (e.g., indicator 370) may be added the displayed content. Indicator 370 may correspond to content previously presented within the web browser 112 or application 110. For example, indicator 370 may correspond to the job content that is shown in GUI 350. As such, when a user interacts with indicator 370, GUI 360 may be updated to present content 356, i.e., content corresponding to indicator 370. Additionally, as shown, indicator 370 is added to GUI 360, adjacent the previously generated indicator 358. In this manner, a user can easily navigate between content.

Figure 4:
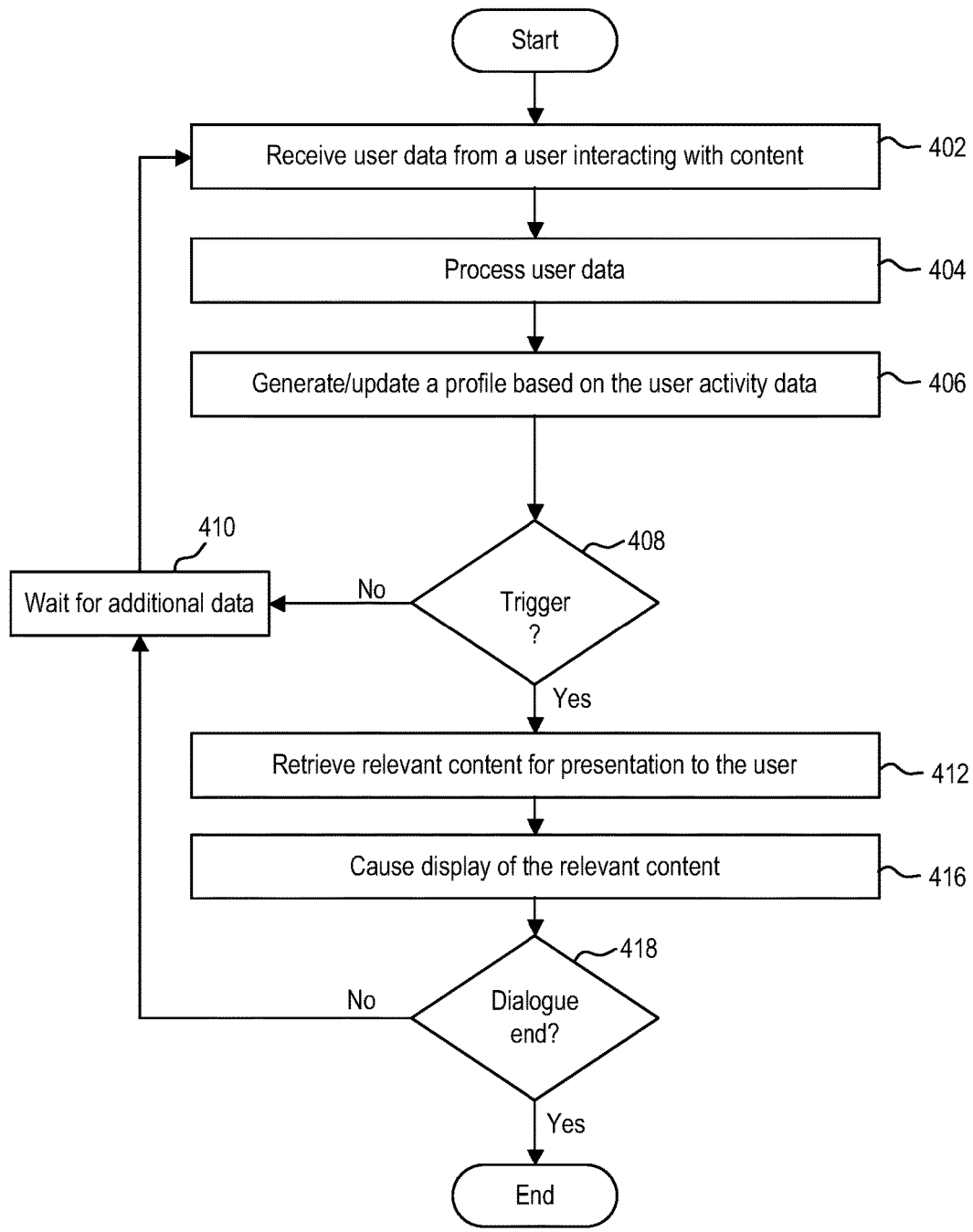
FIG. 4 is a flow diagram of a method of generating a graphical user interface, according to example embodiments.

FIG. 4 is a flow diagram illustrating a method 400 of generating an interactive graphical user interface (GUI) according to example embodiments. Method 400 may begin at step 402.

At step 402, organization computing system 104 may receive user data from a user interacting with content hosted by third party system 106. In some embodiments, user data may be representative of user activity, intelligent assistant activity, and document uploads.

User activity may include one or more of IP information (e.g., device location), campaigns (e.g., sites the user visited from), pages of the website viewed, portions of the website viewed (e.g., job postings), time spent on each webpage of the website, browser language, cursor movements, portions of the application viewed, time spent on each portion of the application, and the like. User activity may be received at organization computing system 104 using customization integration 118.

Intelligent assistant activity 204 may include communications between an end user of client device 102 and intelligent assistant 126. For example, intelligent assistant activity 204 may include messages received from client device 102.

Document uploads 206 may include one or more documents uploaded by a user during the user's communication session with intelligent assistant 126. Exemplary documents may include, but are not limited to, resumes, cover letters, school transcripts, recommendation letters, completed questionnaires, and the like.

At step 404, organization computing system 104 may process the user data received. In some embodiments, customization module 128 may log the user activity to identify potential interests of the user. In some embodiments, intelligent assistant 126 may utilize one or more natural language processing and machine learning techniques to determine a meaning of the user's message and generate an appropriate message for response. In some embodiments, intelligent assistant 126 may be configured to process the messages provided by the user to identify one or more keywords contained in the message. The one or more keywords identified by intelligent assistant 126 may be utilized by customization module 128 for providing customized content to the user.

In some embodiments, NLP module 130 may receive and analyze document uploads 206. NLP module 130 may extract information that may be used by customization module 128 for generating the profile of the user. For example, NLP module 130 may extract information directed to: employment history, education history, job skills, keywords, and the like. NLP module 130 may provide the extracted information to customization module 128 for continued generation of the user's profile.

At step 406, organization computing system 104 may generate or update a profile for the user based on the user's activity data. In some embodiments, customization module 128 may build a profile for the user in real-time (or near real-time) based on the one or more keywords and/or phrases and the activity, using one or more heuristics to identify content to be provided to the user. The profile may include attributes about the user, such as, but not limited to location information, employment history, age, gender, educational background, areas of interest, and the like. In some embodiments, the profile may further include one or more tags corresponding to attributes of the user. The one or more tags may allow customization module 128 to retrieve relevant content from database 108 for presentation to the user.

At step 408, organization computing system 104 may determine whether a trigger is identified. In some embodiments, a trigger may correspond to a key word or trigger word in a message sent by client device 102 to intelligent assistant 126. If, at step 408, customization module 128 determines that a trigger is not present, then method 400 may proceed to step 410 and organization computing system 104 may wait for additional user activity data.

If, however, at step 408, customization module 128 determines that a trigger is present, i.e., a user's message contains a key word or trigger word, then method 400 may proceed to step 412. At step 412, organization computing system 104 may retrieve relevant content for presentation to the user. For example, customization module 128 may identify the type of content suitable for the user based on the key word or trigger word. Customization module 128 may further tailor the selection of relevant content based on the generated profile of the user. For example, if the key word or trigger word is "looking for a job," customization module 128 may identify content related to job openings. Customization module 128 may select the specific content based on the profile of the user. For example, customization module 128 may determine, based on the user's uploading of a resume, that the user has experience in product management. Accordingly, customization module 128 may generate a tag in the user's profile corresponding to product management. As such, when customization module 128 retrieves the job information from database 108, customization module 128 may search for job information content relevant to product management based on the tag.

At step 416, organization computing system 104 may cause the relevant content to be displayed. For example, customization module 128 may provide web browser 112 of client device 102 with the relevant content for display in a webpage currently being viewed by the user. In another example, customization module 128 may provide application 110 of client device 102 with the relevant content for display with content presented via application 110.

At step 418, organization computing system 104 may determine whether the dialogue ended. In other words, organization computing system 104 may determine whether the user has stopped interacting with intelligent assistant 126 or has otherwise terminated the conversation. If, at step 418, organization computing system 104 determines that the dialogue has not ended, then method 400 may proceed at step 410 and organization computing system 104 may wait for additional user activity data. If, however, at step 418, organization computing system 104 determines that the dialogue has ended, then method 400 may end.

Figure 5A:
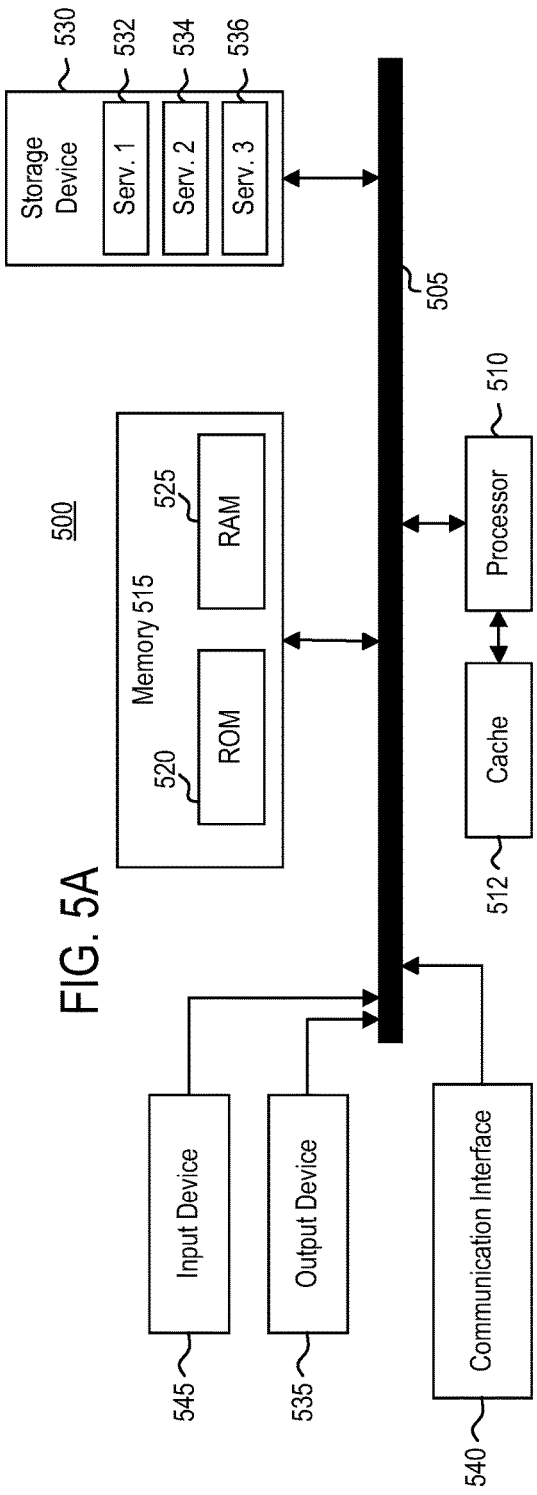
FIG. 5A illustrates a system bus computing system architecture, according to example embodiments.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 5 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communication interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

Figure 5B:
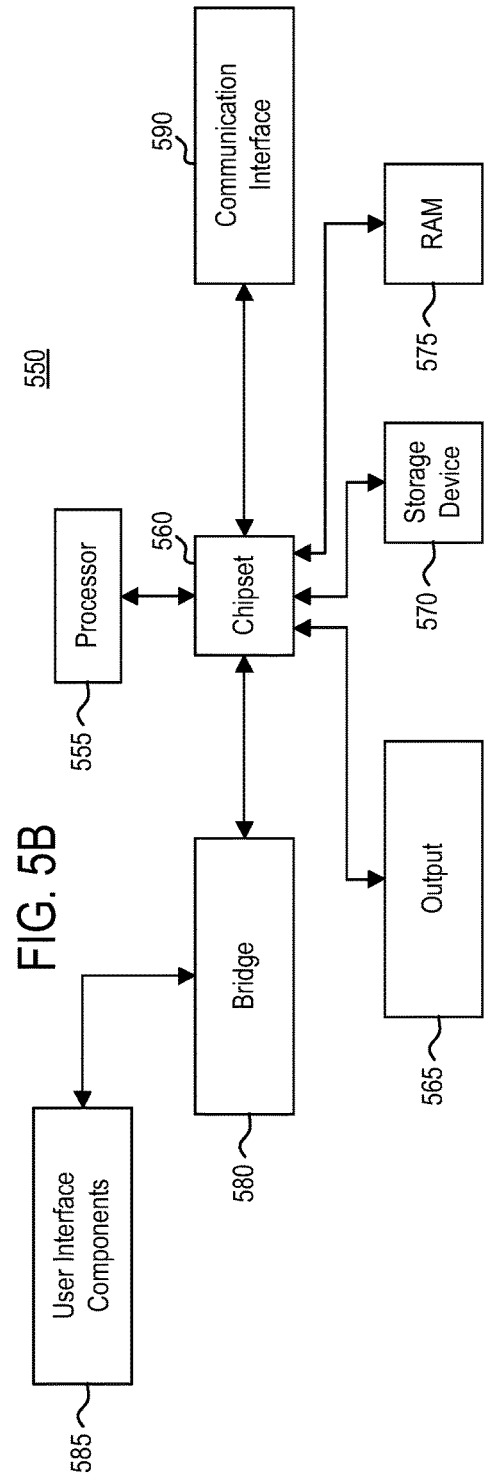
FIG. 5B illustrates a computer system having a chipset architecture, according to example embodiments.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
    receiving, by a computing system, user activity data from a user interacting with content of a website hosted by a third party computing system separate from the computing system, wherein the user activity data is received via one or more integrations injected into code associated with the website and wherein the website comprises a chat interface linking the user to an intelligent assistant hosted by the computing system;
    generating, by the computing system, a profile for the user based on the user activity data, wherein the profile comprises tags indicating attributes about the user;

establishing, by the computing system, a communication session between the user and the intelligent assistant via the chat interface;

receiving, by the computing system, a message from the user to the intelligent assistant;

determining, by the computing system, that the message comprises a key word triggering retrieval of relevant content;

based on the determining, retrieving, by the computing system, the relevant content that is associated with the key word and relevant to the user based on the tags associated with the profile; and causing, by the computing system, a client device associated with the user to display the relevant content alongside the chat interface.

2. The method of claim 1, wherein receiving, by the computing system, the user activity data comprises:

receiving a document uploaded to the website.

3. The method of claim 2, wherein generating, by the computing system, the profile for the user based on the user activity data comprises:

applying natural language processing techniques to the document to extract relevant information about the user from the document; and assigning a tag to the user based on the relevant information.

4. The method of claim 1, wherein receiving, by the computing system, the user activity data comprises:

receiving activity data comprising one or more of internet protocol address information, additional websites from which the user visited, webpages of the website viewed, portions of the website viewed, time spent on each webpage of the website, cursor movements, and browser language.

5. The method of claim 1, further comprising:

receiving, by the computing system, an additional message from the user to the intelligent assistant;

determining, by the computing system, that the additional message comprises at least one additional key word;

based on the determining, retrieving, by the computing system, additional content that is associated with an additional key word and relevant to the user based on the tags associated with the profile; and causing, by the computing system, the client device associated with the user to display the additional content alongside the chat interface.

6. The method of claim 5, further comprising:

responsive to determining that the additional message comprises the at least one additional key word, updating, by the computing system, the profile of the user.

7. The method of claim 1, wherein generating, by the computing system, the profile for the user based on the user activity data comprises:

applying one or more heuristics to the user activity data to generate the profile.

8. A non-transitory computer readable medium comprising instructions which, when executed by a processor, cause a computing system to perform operations, comprising:

receiving, by the computing system, user activity data from a user interacting with content of a website hosted by a third party computing system separate from the computing system, wherein the user activity data is received via one or more integrations injected into code associated with the website and wherein the website comprises a chat interface linking the user to an intelligent assistant hosted by the computing system;

generating, by the computing system, a profile for the user based on the user activity data, wherein the profile comprises tags indicating at least one attribute about the user;

establishing, by the computing system, a communication session between the user and the intelligent assistant via the chat interface;

receiving, by the computing system, a message from the user to the intelligent assistant;

determining, by the computing system, that the message comprises a key word triggering retrieval of relevant content;

based on the determining, retrieving, by the computing system, the relevant content that is associated with the key word and relevant to the user based on the tags associated with the profile; and causing, by the computing system, a client device associated with the user to display the relevant content alongside the chat interface.

9. The non-transitory computer readable medium of claim 8, wherein receiving, by the computing system, the user activity data comprises:

receiving a document uploaded to the website.

10. The non-transitory computer readable medium of claim 9, wherein generating, by the computing system, the profile for the user based on the user activity data comprises:

applying natural language processing techniques to the document to extract relevant information about the user from the document; and assigning a tag to the user based on the relevant information.

11. The non-transitory computer readable medium of claim 8, wherein receiving, by the computing system, the user activity data comprises:

receiving activity data comprising one or more of internet protocol address information, additional websites from which the user visited, webpages of the website viewed, portions of the website viewed, time spent on each webpage of the website, cursor movements, and browser language.

12. The non-transitory computer readable medium of claim 8, further comprising:

receiving, by the computing system, an additional message from the user to the intelligent assistant;

determining, by the computing system, that the additional message comprises an additional key word;

based on the determining, retrieving, by the computing system, additional content that is associated with the additional key word and relevant to the user based on the tags associated with the profile; and causing, by the computing system, the client device associated with the user to display the additional content alongside the chat interface.

13. The non-transitory computer readable medium of claim 12, further comprising:

responsive to determining that the additional message comprises the additional key word, updating, by the computing system, the profile of the user.

14. The non-transitory computer readable medium of claim 8, wherein generating, by the computing system, the profile for the user based on the user activity data comprises:

applying one or more heuristics to the user activity data to generate the profile.

15. A system, comprising:

a processor; and a memory having programming instructions stored thereon, which, when executed by the processor, causes the system to perform operations, comprising:

receiving user activity data from a user interacting with content of a website hosted by a third party computing system separate from the system, wherein the user activity data is received via one or more integrations injected into code associated with the website and wherein the website comprises a chat interface linking the user to an intelligent assistant hosted by the system;

generating a profile for the user based on the user activity data, wherein the profile comprises tags indicating attributes about the user;

establishing a communication session between the user and the intelligent assistant via the chat interface;

receiving a message from the user to the intelligent assistant;

determining that the message comprises a key word triggering retrieval of relevant content;

based on the determining, retrieving the relevant content that is associated with the key word and relevant to the user based on the tags associated with the profile; and causing a client device associated with the user to display the relevant content alongside the chat interface.

16. The system of claim 15, wherein receiving the user activity data comprises:

receiving a document uploaded to the website.

17. The system of claim 16, wherein generating the profile for the user based on the user activity data comprises:

applying natural language processing techniques to the document to extract relevant information about the user from the document; and assigning a tag to the user based on the relevant information.

18. The system of claim 15, wherein receiving the user activity data comprises:

receiving activity data comprising one or more of internet protocol address information, additional websites from which the user visited, webpages of the website viewed, portions of the website viewed, time spent on each webpage of the website, cursor movements, and browser language.

19. The system of claim 15, wherein the operations further comprise:

receiving an additional message from the user to the intelligent assistant;

determining that the additional message comprises at an additional key word;

based on the determining, retrieving additional content associated with the additional key word and relevant to the user based on the tags associated with the profile; and causing the client device associated with the user to display the additional content alongside the chat interface.

20. The system of claim 19, further comprising:

responsive to determining that the additional message comprises the additional key word, updating the profile of the user.

\* \* \* \* \*